US012625624B2

(12) United States Patent
Cohen et al.

(10) Patent No.: US 12,625,624 B2
(45) Date of Patent: May 12, 2026

(54) SYSTEMS, METHODS, AND DEVICES FOR POWER DOMAIN MANAGEMENT

(71) Applicant: Infineon Technologies LLC, San Jose, CA (US)

(72) Inventors: Itzic Cohen, Netanya (IL); Yair Sofer, Tel-Aviv (IL); Guy Levi, Burgata (IL); Eran Geyari, Netanya (IL)

(73) Assignee: Infineon Technologies LLC, San Jose, CA (US)

( * ) Notice: Subject to any disclaimer, the term of this patent is extended or adjusted under 35 U.S.C. 154(b) by 0 days.

(21) Appl. No.: 18/539,734

(22) Filed: Dec. 14, 2023

(65) Prior Publication Data

US 2025/0199697 A1     Jun. 19, 2025

(51) Int. Cl.
*G06F 3/06* (2006.01)
*G06F 1/3203* (2019.01)
*G06F 1/3287* (2019.01)
*G06F 1/3296* (2019.01)

(52) U.S. Cl.
CPC .......... *G06F 3/0625* (2013.01); *G06F 3/0659* (2013.01); *G06F 3/0673* (2013.01); *G06F 1/3203* (2013.01); *G06F 1/3287* (2013.01); *G06F 1/3296* (2013.01)

(58) Field of Classification Search
CPC .... G06F 3/0625; G06F 3/0659; G06F 3/0673; G06F 1/3203; G06F 1/3287; G06F 1/3296
See application file for complete search history.

(56) References Cited

U.S. PATENT DOCUMENTS

| | | | |
|---|---|---|---|
| 2016/0124490 A1* | 5/2016 | Kupermann | G06F 1/3275 |
| | | | 713/324 |
| 2021/0055986 A1* | 2/2021 | Lam | G06F 11/1044 |
| 2021/0375332 A1* | 12/2021 | Akamatsu | G06F 3/0659 |

FOREIGN PATENT DOCUMENTS

| | | |
|---|---|---|
| TW | 202303589 A | 1/2023 |

OTHER PUBLICATIONS

Taiwanese Office Action from TW 113144775 mailed Jan. 21, 2026 (10 pages).

* cited by examiner

*Primary Examiner* — Janice M. Girouard

(57) ABSTRACT

Systems, methods, and devices provide management of power domains. Methods include activating a first power domain of a memory controller in response to receiving a memory command associated with a storage location coupled to the memory controller, and performing a first portion of a sequence of operations determined based on the memory command, the first portion being performed using a first plurality of processing elements included in the first power domain. Methods further include activating a second power domain of the memory controller based on a timing determined by the sequence of operations, and performing a second portion of the sequence of operations using a second plurality of processing elements included in the second power domain.

14 Claims, 7 Drawing Sheets

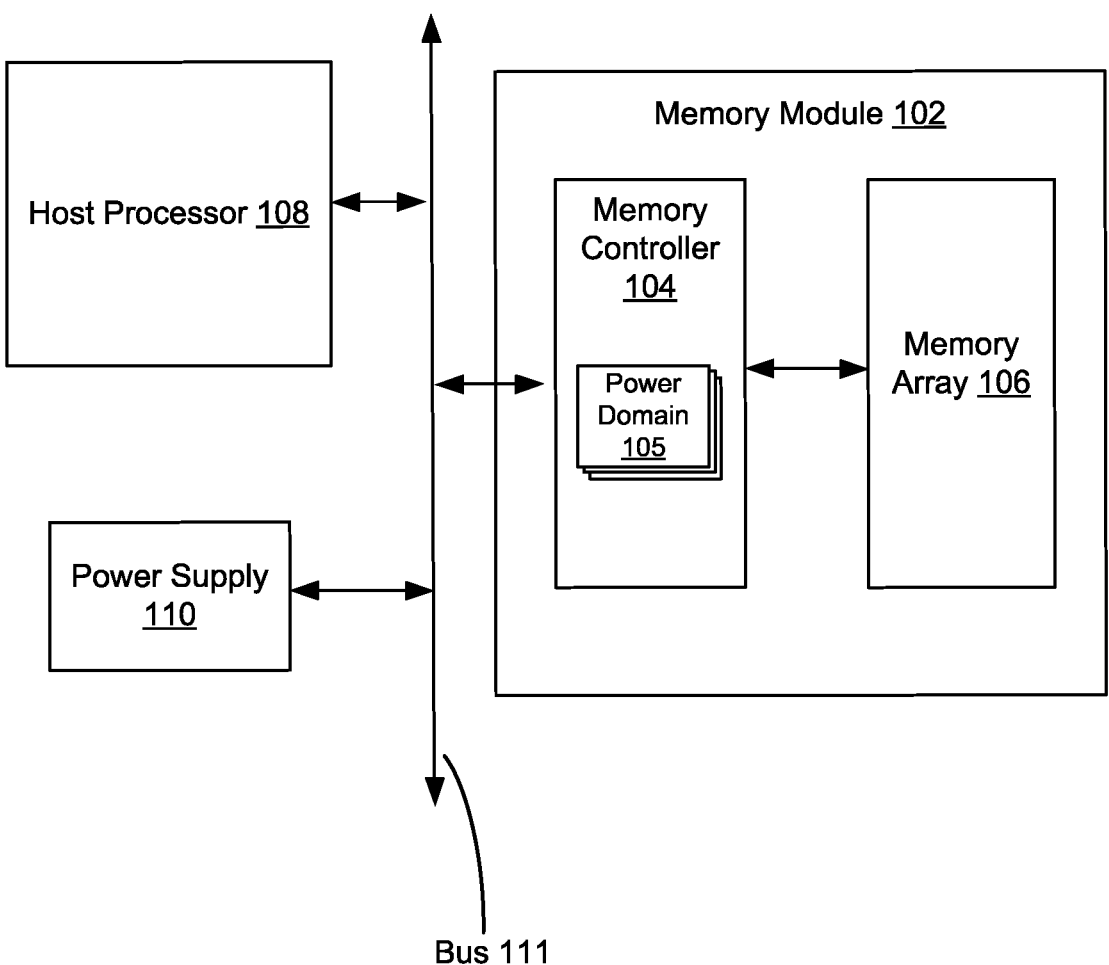
*FIG. 1*

Memory Controller 301

Power Supply
306

First Power Domain
302

Processing
Logic
310

Switch
308

Second Power
Domain
304

400

```
┌─────────────────────────────────────────────────────────┐
│                    Memory Controller 401                  │
│                                                           │
│  ┌──────────────────┐              ┌──────────────────┐  │
│  │                  │              │                  │  │
│  │ First Power      │              │ First Power      │  │
│  │ Supply           ├──────────────┤ Domain           │  │
│  │ 406              │              │ 402              │  │
│  │                  │              │                  │  │
│  └──────────────────┘              └──────────────────┘  │
│                          ┌──────────┐                     │
│                          │Processing│                     │
│                          │ Logic    │                     │
│                          │ 410      │                     │
│                          └──────────┘                     │
│  ┌──────────────────┐              ┌──────────────────┐  │
│  │ Second Power     │              │ Second Power     │  │
│  │ Supply           ├──────────────┤ Domain           │  │
│  │ 408              │              │ 404              │  │
│  │                  │              │                  │  │
│  └──────────────────┘              └──────────────────┘  │
│                                                           │
└─────────────────────────────────────────────────────────┘
```

Power Domain Management Method

*602*
Activate a first power domain of a memory device

*604*
Perform a read operation for a memory array included in the memory device

*606*
Activate a second power domain of the memory device

*608*
Perform, using the second power domain, data verification operations on data read from the memory array Done

SYSTEMS, METHODS, AND DEVICES FOR POWER DOMAIN MANAGEMENT

TECHNICAL FIELD

This disclosure relates to management of power domains, and more specifically, to enhancement of management of power domains associated with memory.

BACKGROUND

Memory modules may include components, such as a memory controller and a memory array. The memory controller may receive commands from other components and process those commands to execute read and write operations associated with the memory array. Accordingly, the memory controller may include processing logic configured to perform such read and write operations. Conventional techniques for implementing such memory controllers remain limited because they remain inefficient in power consumption associated with usage of such processing logic.

BRIEF DESCRIPTION OF THE DRAWINGS

FIG. 1 illustrates an example of a system for power domain management, configured in accordance with some embodiments.

FIG. 4 illustrates an additional example of a device for power domain management, configured in accordance with some embodiments.

DETAILED DESCRIPTION

Figure 2:
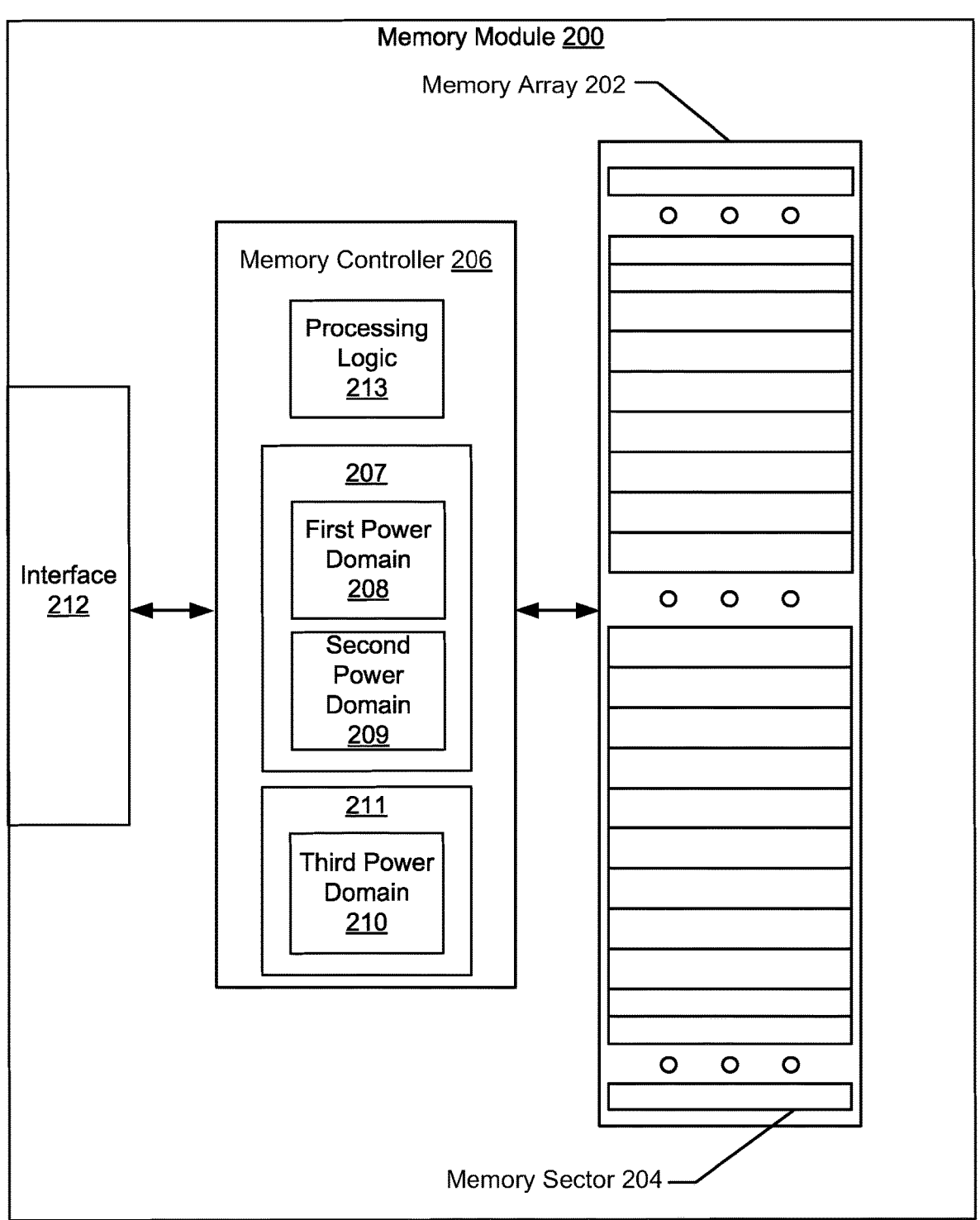
FIG. 2 illustrates an example of a device for power domain management, configured in accordance with some embodiments.

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Memory controllers may include processing logic configured to execute various operations associated with memory accesses. Accordingly, different portions of such processing logic may be configured to perform different operations associated with a particular memory command. For example, a read command may be issued to request data to be read from memory. Such a read command may include multiple different memory operations, such as a read operation and a data verification operation. In various embodiments, such operations may be performed serially as the data is read out of the memory array before it is verified by the memory controller. Conventional techniques for implementing such memory commands remain limited because processing logic for different operations remains powered, even when not in use, thus resulting in inefficient power consumption by the memory controller and relatively high leakage currents from unused processing logic that remains powered.

Embodiments disclosed herein provide dynamic implementation and activation of different power domains for different portions of memory operations. As will be discussed in greater detail below, different power domains may correspond to different operations associated with a memory command, and such power domains may be activated dynamically depending on their usage within the context of execution of the memory command. Accordingly, as will be discussed in greater detail below, power domains are used dynamically as they are invoked, and an overall power consumption of the memory controller executing the memory command is reduced. Moreover, a leakage current is also reduced, where such a leakage current may be associated with processing elements that remain powered even during a standby mode.

FIG. 1 illustrates an example of a system for power domain management, configured in accordance with some embodiments. As similarly discussed above, a system, such as system 100, may include and manage multiple power domains to stagger their activation when reading data from memory. As will be discussed in greater detail below, increased granularity in power domain control and activation during memory operations improves the efficiency of usage of such power domains as well as power consumption incurred by such power domain usage and an associated leakage current.

As shown in FIG. 1, system 100 includes host processor 108 which is configured to perform one or more processing operations that may be associated with a host application or other user application. In one example, host processor 108 may be a microcontroller configured to execute commands that may include user-defined commands. Accordingly, commands may be generated by host processor 108 and may be passed to another component, such as memory module 102, via bus 111. For example, host processor 108 may require data for a processing operation and may issue a read command to memory module 102 to retrieve the data.

Accordingly, system 100 additionally includes memory module 102 which is configured to provide data storage for system 100. In various embodiments, memory module 102 includes memory array 106 that is configured to store data values in storage locations. Accordingly, memory array 106 may be a nonvolatile memory array that includes an arrangement of addressable memory cells configured to store such data values. In one example, memory array 106 may be a resistive random access memory (RRAM) memory. Memory array 106 may have associated processing logic included in memory controller 104. Thus, memory controller 104 may include components such as processing logic and multiplexers configured to select memory cells based on memory addresses. Moreover, memory controller 104 is configured to perform operations executed on memory array 106 such as read and write operations to read data from memory array 106 and write data to memory array 106.

In various embodiments memory controller 104 includes various different power domains, such as power domain 105, which are configured to perform such operations. As disclosed herein, a power domain may be defined based on a configuration of a power supply provided to an implemented logic block. For example, a first group of logic blocks implemented in processing logic of a memory controller that is coupled to a first power supply may be a first power domain. Moreover, a second group of logic blocks implemented in processing logic of a memory controller that is coupled to a second power supply may be a second power domain. It will be appreciated that a first and second power supply in this example may refer to different coupling to the same power supply, as may occur via selective activation of coupling switches. Additional details and examples of such power domains and power supplies are discussed in greater detail below with reference to FIG. 3 and FIG. 4.

As will also be discussed in greater detail below, the power domains may be independently managed and activated dynamically based on a received command, and based on power received from a power supply, such as power supply 110. Management of the power domains in this way enables improved efficiency of their power usage by reducing an amount of time power domains are active but unused. Moreover, such power domains may be powered and depowered based on whether or not system 100 is in a standby mode or an active mode. Accordingly, waking and activation of the power domains during a transition from a standby mode to an active mode may also be managed to improve efficiency of such wake operations by staggering activation of components of memory controller 104 and reducing an amount of time such components are active but unused.

FIG. 2 illustrates an example of a device for power domain management, configured in accordance with some embodiments. Accordingly, a device, such as memory module 200, may include memory array 202 and memory controller 206, as similarly discussed above. As shown in FIG. 2, memory array 202 may include various rows and columns of memory cells which may be included in addressable blocks, such as memory sector 204. Memory module 200 may communicate with one or more additional components, such as a host processor, via a communications interface, such as interface 212.

As also shown in FIG. 2, memory controller 206 includes various different power domains that may be configured to perform various operations supported by memory controller 206. For example, memory controller 206 may include first power domain 208, second power domain 209, and third power domain 210 which may be configured to implement power domain schemes defined by a standby mode and an active mode. For example, first power domain 208 and second power domain 209 may be included in first group of power domains 207 which remains powered during a standby mode and an active mode. Memory controller 206 may also include third power domain 210 which may be included in second group of power domains 211 that is depowered during a standby mode and is powered during an active mode.

As will be discussed in greater detail below, power domains included in first group of power domains 207 may be further configured such that they are selectively enabled and disabled based on commands received via interface 212. Such selective activation of power domains included in first group of power domains 207 allows them to be activated with a higher level of granularity than a general and global transition from a standby mode to an active mode, and allows activation of power domains in a staggered manner. As will be discussed in greater detail below, delaying activation of some power domains until they are invoked by a received command reduces power consumption of memory module 200 when transitioning from a standby mode to an active mode and also reduces a leakage current caused by such power domains.

As will also be discussed in greater detail below, processing logic 213 included in memory controller 206 may be configured to generate and apply control signals to manage the activation and depowering of various power domains. Accordingly, processing logic 213 may be a processing device that includes processing elements implemented in firmware or programmable logic devices or a combination thereof. Moreover, processing logic 213 may be configured to receive and interpret commands received via interface 212 from another system component, such as a host processor. Processing logic 213 may additionally be configured to generate control signals responsive to the received command, where such control signals activate power domains when appropriate as determined based on portions of the received command.

In various embodiments, generation of control signals and activation of power domains may be performed in accordance with a designated mapping of portions of commands to power domains. More specifically, a data structure may be stored in memory controller 206 that identifies which power domain and should be activated at what time for each type of command received at memory controller 226. Accordingly, the data structure may include identifiers configured to identify the power domains, and may also include timing information for each type of received command, where the timing information identifies a time at which an identified power domain is activated or depowered. In this way, memory controller 206 may use the designated mapping to generate a sequence of operations based on an identified type of a received command, and also generate a sequence of control signals to implement the sequence of operations. In various embodiments, the designated mapping may be determined by an entity, such as a manufacturer, and may be stored during a manufacturing process or as part of an update to memory module 200.

Figure 3:
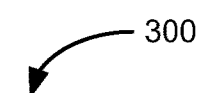
FIG. 3 illustrates another example of a device for power domain management, configured in accordance with some embodiments.

FIG. 3 illustrates another example of a device for power domain management, configured in accordance with some embodiments. As similarly discussed above, device 300 may include memory controller 301 which may be coupled to one or more power supplies, such as power supply 306. Moreover, memory controller 301 includes one or more power domains, such as first power domain 302 and second power domain 304 which may be included in a first group of power domains identified by a standby mode of operation. Accordingly, during a standby mode of operation, power supply 306 continues to provide power to first power domain 302 and second power domain 304 despite other power domains, such as those included in a second group of power domains identified by an active mode of operation, being depowered.

As shown in FIG. 3, memory controller 301 is additionally configured to include one or more switches such as switch 308 that may be coupled between power supply 306 and second power domain 304. Accordingly, switch 308 is configured to provide additional control over activation and depowering of second power domain 304 that is in addition to control provided by power supply 306. As discussed above, control signals controlling operation of switch 308 may be generated by processing logic 310 of memory controller 301. In this way, management of control of switches, such as switch 308, may be used to independently manage different power domains included within the standby group of power domains.

As will be discussed in greater detail below with reference to FIG. 5, different power domains may be used for different operations performed in response to receiving a command. For example, first power domain 302 may include components, such as logic, multiplexers, and buffers, used to read data values from a memory array. Moreover, second power domain 304 may include components, such as logic and buffers used for error correction code (ECC) computations as well as data output operations. Accordingly, multiplexers and ECC logic may be implemented in different power domains.

In response to receiving a read command, memory controller 301 may first activate first power domain 302 to read the data, and may subsequently activate second power domain 304 to perform ECC operations and data output operations. Such staggered activation of second power domain 304 may be implemented via usage of switch 308. Moreover, the delay in activation of second power domain 304 reduces an overall amount of power consumed by second power domain 304 to execute a received command. In the absence of switch 308 and control signals provided by logic 310, second power domain 304 would otherwise continuously consume power.

In some embodiments, implementation of control logic within memory controller 301 enables the creation and implementation of various configurable sub-domains based on portions of a received command. More specifically, portions of the command identifying operational blocks may be mapped to different power domains, and control signals for switches associated with those power domains may have timings configured based on the identified operational blocks. As similarly discussed above, such control signals may be signals used to control switches used to activate and depower power domains.

FIG. 4 illustrates an additional example of a device for power domain management, configured in accordance with some embodiments. As similarly discussed above, device 400 may include memory controller 401 which may include one or more power domains, such as first power domain 402 and second power domain 404. As similarly discussed above, first power domain 402 and second power domain 404 may be included in a first group of power domains identified by a standby mode of operation. Accordingly, one or more of first power domain 402 and second power domain 404 may continue to receive power.

As shown in FIG. 4, memory controller 401 may be coupled to one or more power supplies, such as first power supply 406 and second power supply 408. Thus, according to some embodiments, different power domains within the first group of power domains may each have their own power supply, and the power supplies may be configured to operate independently based on an order of operations associated with a command received by memory controller 401. Thus, instead of operation of a switch via a control signal, operation of independent power supplies may be used to stagger activation and usage of power domains in a standby mode of operation. In some embodiments, first power supply 406 and second power supply 408 may be configured to receive control signals from processing logic 410, and to time their operation based on such control signals. In this way, memory controller 401 may determine and order and timing of operation for first power supply 406 and second power supply 408.

Figure 5:
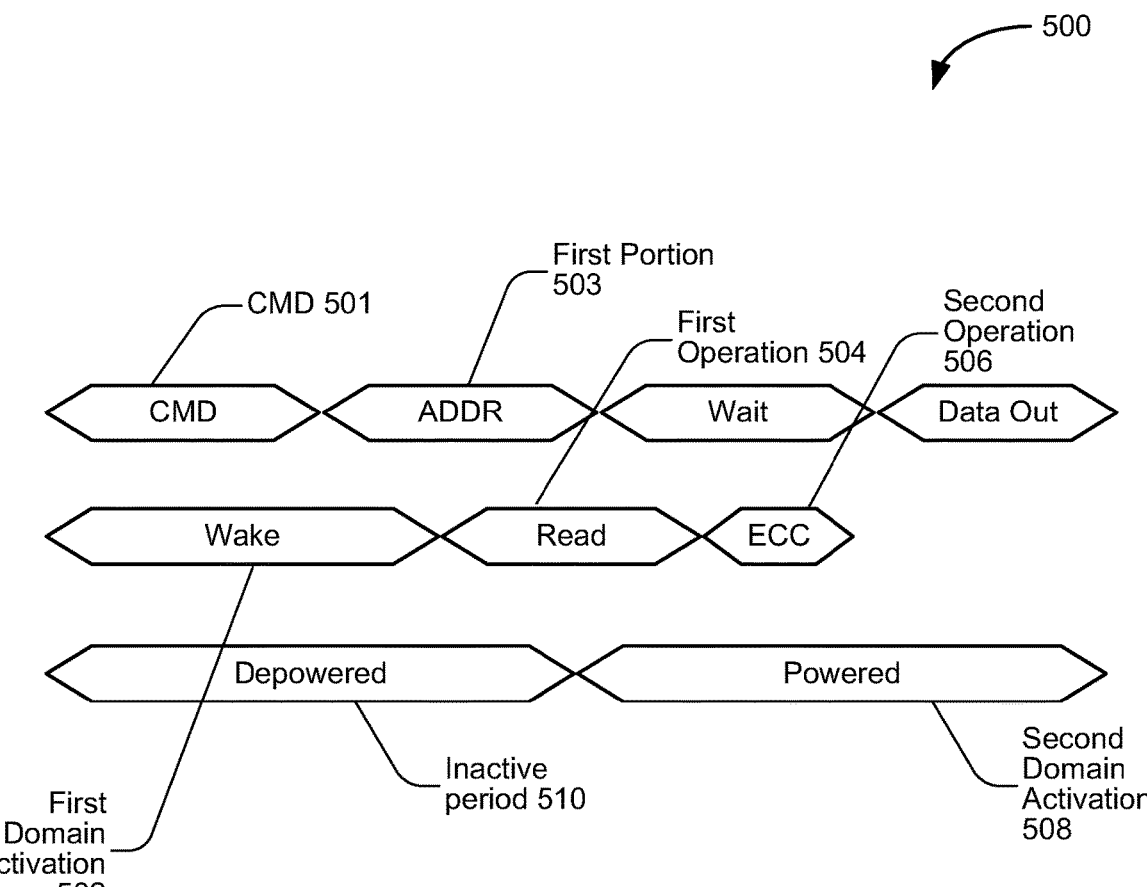
FIG. 5 illustrates an image of a timing diagram of commands and operations associated with power domain management, performed in accordance with some embodiments.

FIG. 5 illustrates an image of a timing diagram of commands and operations associated with power domain management, performed in accordance with some embodiments. As shown in diagram 500, different power domains may be activated at different times to perform different portions of a sequence of operations of a received command at a memory module. For example, a command may be received and detected at the memory module, as indicated by CMD 501. In response to detecting the command, first domain activation 502 may occur in which a first power domain is activated and transitions from a depowered to a powered state. As discussed above, this may occur via activation of a switch or activation of a power supply, or a combination thereof.

Processing logic of the memory module may identify first portion 503 of the command that identifies a read operation and a read address. Accordingly, such information may be used by the first power domain during first operation 504. Accordingly, read circuitry implemented in the first power domain may be used to read data out of the memory array. In various embodiments, a second power domain may be activated during second domain activation 508. As shown in diagram 500, such activation may begin prior to the termination of the read operation in anticipation of ECC operations and data output operations that are performed by logic and circuitry included in the second power domain. In various embodiments, timing information for activation and deactivation of power domains may be determined by the memory controller based, at least in part, on data included in the received memory command as well as information about designated sequences of events and/or operations, as will be discussed in greater detail below.

Once powered up, the second power domain may be used to perform second operation 506 which may include ECC operations as well as data output operations. In various embodiments, second operation 506 as well as a timing of second operation 506 may be identified based on a designated sequence of operations, as similarly discussed above and as will be discussed in greater detail below. As also shown in diagram 500, the second power domain is depowered during inactive period 510, and is activated dynamically in response to a determination made based on a received command. Accordingly, power consumption associated with the second power domain is reduced because it remains depowered when not in use during execution of the command by the memory module. It will be appreciated that an associated leakage current is also reduced because processing logic, such as gates, used to implement components such as multiplexers can be depowered when not in use, thus reducing their associated leakage currents.

Figure 6:
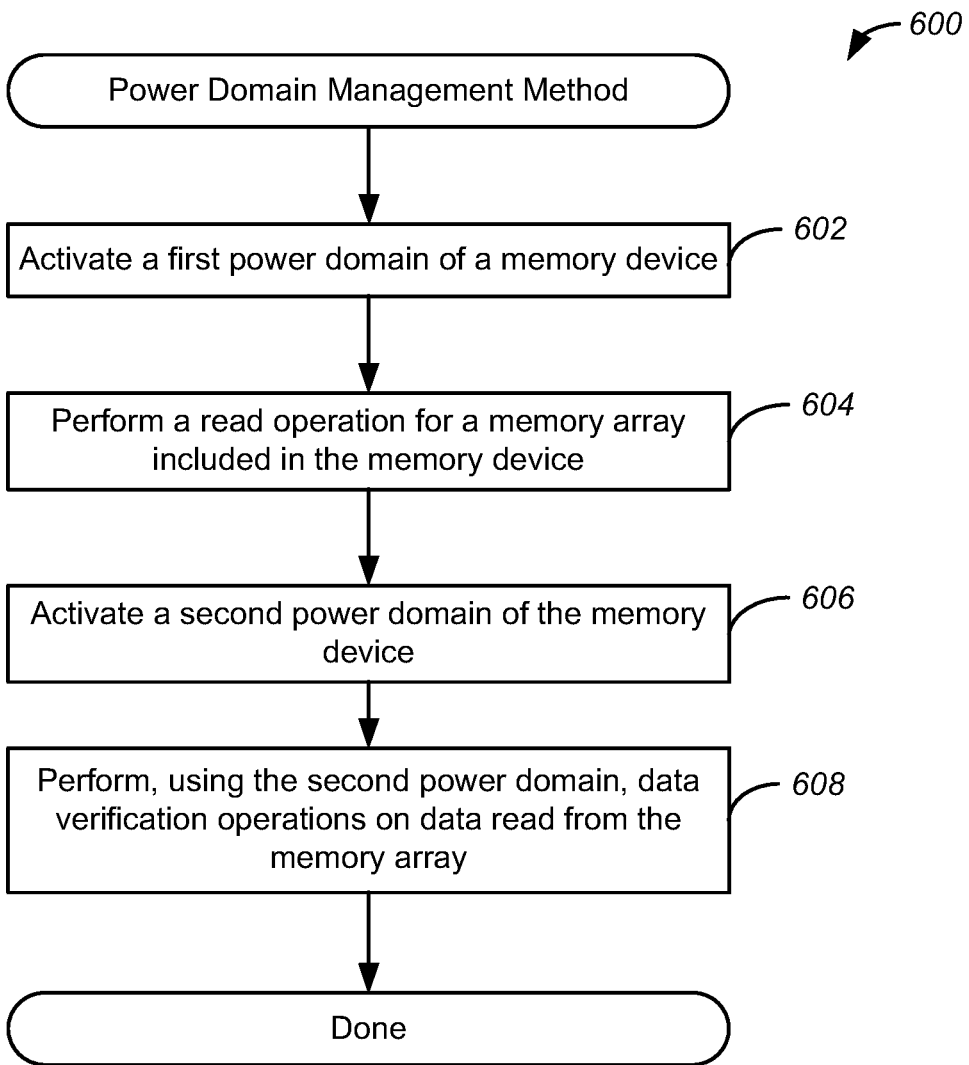
FIG. 6 illustrates a flow chart of an example of a method for power domain management, performed in accordance with some embodiments.

FIG. 6 illustrates a flow chart of an example of a method for power domain management, performed in accordance with some embodiments. Accordingly, a method, such as method 600, may be performed to manage multiple power domains when executing a command at a memory module. As will be discussed in greater detail below, increased control over activation and depowering of such power domains improves the efficiency of usage of such power domains as well as power consumption and leakage current incurred by such power domain usage.

Method 600 may perform operation 602 during which a first power domain of a memory device may be activated. As similarly discussed above, the first power domain may be activated responsive to receiving a command at a memory controller. The first power domain may include processing elements configured to read data out of an associated memory array. In various embodiments, the activation may include transitioning the first power domain from a depowered mode or a standby mode to an active mode.

Method 600 may perform operation 604 during which a read operation may be performed for a memory array included in the memory device. Accordingly, processing elements implemented in the first power domain may be used to read data out of the memory array. As similarly discussed above, the retrieved data may be identified based on, for example, an address included in the received command.

Method 600 may perform operation 606 during which a second power domain of the memory device may be activated. In various embodiments, the second power domain may be activated responsive to a portion of the received command being executed. For example, the second power domain may be activated in response to the read operation being performed. In various embodiments, the activation may include transitioning the second power domain from a depowered state to a powered state. Accordingly, the second power domain may be completely depowered prior to activation, and may be transitioned to a powered active state once activated.

Method 600 may perform operation 608 during which data verification operations may be performed on data read from the memory array. Accordingly, processing elements implemented in the second power domain may be used to perform data verification operations on the data that was read out of the memory array. Moreover, one or more data output operations may be performed to provide the retrieved data to another component, such as a host processor.

Figure 7:
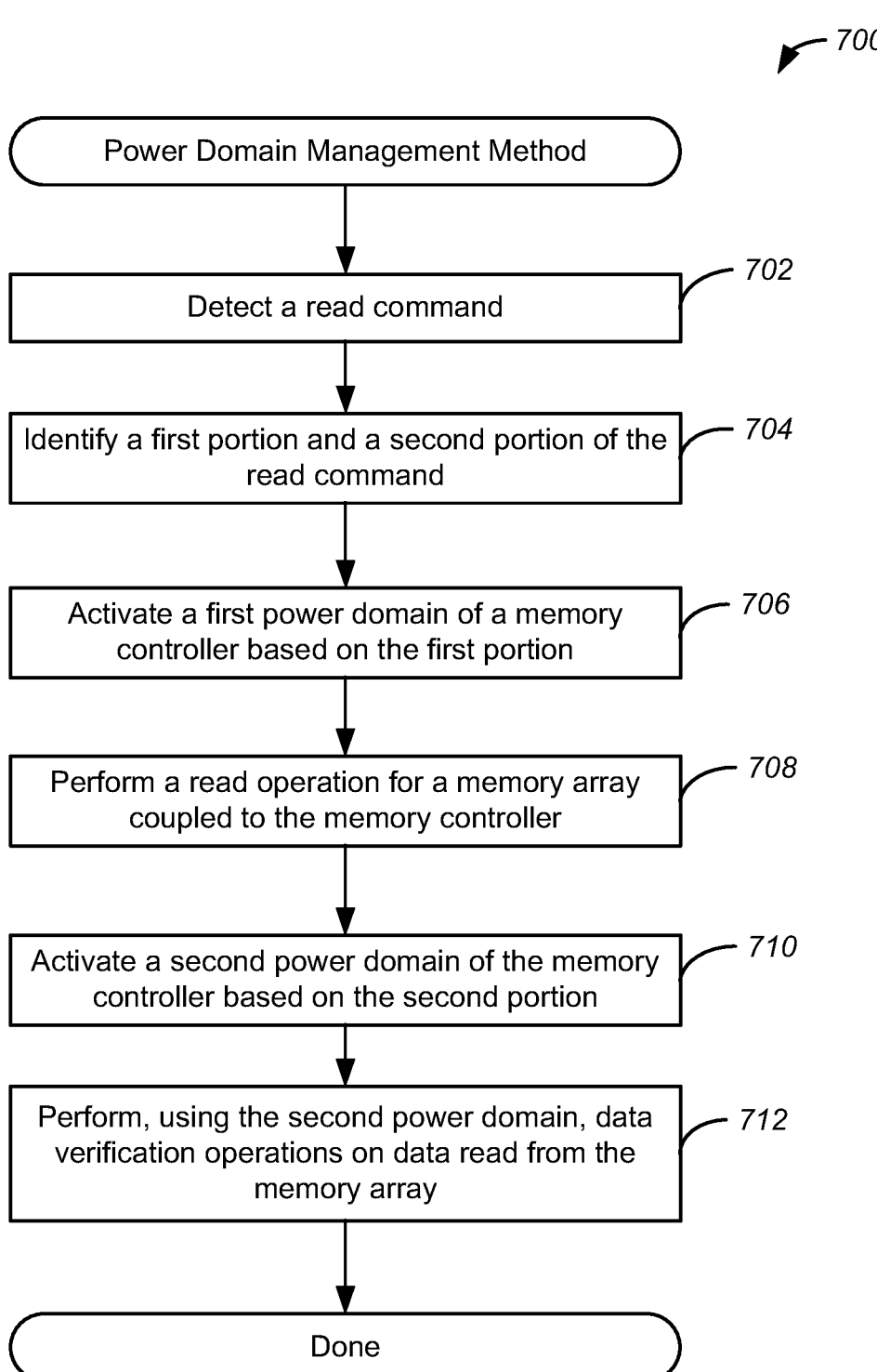
FIG. 7 illustrates a flow chart of another example of a method for power domain management, performed in accordance with some embodiments.

FIG. 7 illustrates a flow chart of another example of a method for power domain management, performed in accordance with some embodiments. Accordingly, a method, such as method 700, may be performed to manage multiple power domains when executing a command at a memory module. As will be discussed in greater detail below, a received command may be partitioned and handled by different power domains to facilitate efficient usage of those power domains.

Method 700 may perform operation 702 during which a read command may be detected. As similarly discussed above, commands may be received at a memory controller from various other associated components that are requesting read and/or write access to memory. Accordingly, during operation 702, a command may be received at the memory controller via a communications interface, which may be a communications bus. The command may include information such as identifiers specifying the command as well as associated data, such as a memory address or other storage location identifier.

Method 700 may perform operation 704 during which a first portion and a second portion of the read command may be identified. In some embodiments, the memory controller may identify various portions of the command that correspond to different operations. For example, a read command may have a designated sequence of events or operations which may be designated by an entity, such as a manufacturer. Accordingly, in response to receiving a command, the memory controller may identify portions that correspond to each of the specified operations, and may also identify power domains associated with those specified operations.

While embodiments disclosed herein make reference to portions of commands, it will be appreciated that the portions may be of a designated sequence of operations determined based on a received command. As similarly discussed above, a read command may be received and used to identify a sequence of operations that includes a read operation and a subsequent data verification operation. Accordingly, an initial portion of a read command may be used to identify a sequence of multiple operations, and such operations may be implemented using a staggered activation of power domains, as will be discussed in greater detail below.

Method 700 may perform operation 706 during which a first power domain of a memory controller may be activated based on the first portion. As similarly discussed above, the first power domain may be activated responsive to receiving the command at a memory controller and identifying the first portion of a sequence of operations as a read operation. The first power domain may include processing elements configured to read data out of an associated memory array. Moreover, during operation 706, the memory array itself may be activated and woken up. Accordingly, in response to identifying the read operation, the memory controller may activate the first power domain by transitioning the first power domain from a standby mode or a depowered mode to an active mode.

Method 700 may perform operation 708 during which a read operation may be performed for a memory array coupled to the memory controller. Accordingly, processing elements implemented in the first power domain may be used to read data out of the memory array. As similarly discussed above, the retrieved data may be identified based on, for example, an address included in the received command. In some embodiments, the data read out may be temporarily stored within registers of the memory controller.

Method 700 may perform operation 710 during which a second power domain of the memory controller may be activated based on the second portion. In various embodiments, the second power domain may be activated responsive to the first portion of the received command being executed. For example, the second power domain may be activated in response to the read operation being performed as well as the designated sequence of events/operations and/or second portion. As similarly discussed above, the memory controller may have a designated sequence of operations performed for a requested read command. As also discussed above, the designated sequence of operations may be defined by an entity, such as a manufacturer or user, or by a memory standard. The designated sequence may include performing ECC computations upon completion of a read operation, and such sequences may have associated timings stored as timing information. Accordingly, in response to a read operation being initially identified based on the received command, and in response to the first portion of the command being executed, the second power domain may be activated. In another example, a second portion of the command may identify one or more data verification operations to be performed, such as ECC computations, and the second power domain may be identified and activated based on the operations specified in the second portion of the received command. As discussed above, the activation may include transitioning the second power domain from a depowered state to a powered state.

As similarly discussed above with reference to FIG. 5, initiation of activation of the second power domain may occur prior to the data verification operations and in parallel with the read operation. In this way, the second power domain is made available by the time the data verification operations are to be performed, as may be determined based on the designated sequence of operations. Accordingly, timing of the activation of the second power domain is implemented such that there is reduced or no latency for data verification operations following the read operations.

Method 700 may perform operation 712 during which data verification operations may be performed on data read from the memory array. Accordingly, as similarly discussed above, processing elements implemented in the second power domain may be used to perform data verification operations on the data that was read out of the memory array.

Moreover, one or more data output operations may be performed to provide the retrieved data to another component, such as a host processor.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:

activating a first power domain of a memory controller in response to receiving a memory command associated with a storage location coupled to the memory controller, wherein the memory command includes a read command;

performing a first portion of a sequence of operations determined based on the memory command, the first portion being performed using a first plurality of processing elements included in the first power domain, wherein the first portion identifies a read operation;

activating a second power domain of the memory controller based on a timing determined based on the sequence of operations; and performing a second portion of the sequence of operations using a second plurality of processing elements included in the second power domain, wherein the second portion identifies a data verification operation and wherein the activating of the second power domain is performed parallel to the read operation.

2. The method of claim 1, wherein the read command identifying data to be read from the storage location.

3. The method of claim 1, wherein the data verification operation comprises:

Computing an error correction code (ECC) based on the data read from the storage location.

4. The method of claim 1, wherein the activating of the first power domain and the activating of the second power domain further comprise:

transitioning from a depowered state to a powered state.

5. The method of claim 1, wherein associations between the sequence of operations and power domains are stored by the memory controller in a designated mapping.

6. The method of claim 1 further comprising:

determining timing information for the activation of the second power domain based, at least in part, on data representing the sequence of operations.

7. The method of claim 1 further comprising:

receiving an additional memory command;

activating a third power domain of the memory controller; and performing at least some of the additional memory command using a third plurality of processing elements included in the third power domain.

8. A system comprising:

a nonvolatile memory array; and a memory controller configured to:

activate a first power domain in response to receiving a memory command associated with the nonvolatile memory array;

perform a first portion of a sequence of operations determined based on the memory command, the first portion being performed using a first plurality of processing elements included in the first power domain;

activate a second power domain based on a timing determined based on the sequence of operations; and perform a second portion of the sequence of operations using a second plurality of processing elements included in the second power domain, wherein the first portion identifies a read operation, wherein the second portion identifies a data verification operation, and wherein the activating of the second power domain is performed parallel to the read operation.

9. The system of claim 8 further comprising:

a first power supply coupled to the first power domain and configured to activate the first power domain in response to a first control signal received from the memory controller; and a second power supply coupled to the second power domain and configured to activate the second power domain in response to a second control signal received from the memory controller.

10. The system of claim 8, wherein the data verification operation comprises computing an error correction code (ECC) based on the data read from the nonvolatile memory array.

11. The system of claim 8, wherein associations between the sequence of operations and power domains are stored by the memory controller in a designated mapping.

12. A device comprising:

a memory controller configured to:

activate a first power domain in response to receiving a memory command associated with a nonvolatile memory array;

perform a first portion of a sequence of operations determined based on the memory command, the first portion being performed using a first plurality of processing elements included in the first power domain;

activate a second power domain based on a timing determined based on the sequence of operations; and perform a second portion of the sequence of operations using a second plurality of processing elements included in the second power domain, wherein the first portion identifies a read operation, and wherein the second portion identifies a data verification operation, and wherein the activating of the second power domain is performed parallel to the read operation.

13. The device of claim 12, wherein the nonvolatile memory array is a resistive random access memory (RRAM) array.

14. The device of claim 12, wherein the data verification operation comprises computing an error correction code (ECC) based on the data read from the nonvolatile memory array.

* * * * *